Aug. 30, 1966  B. DIVER ETAL  3,269,786
BEARING ASSEMBLY

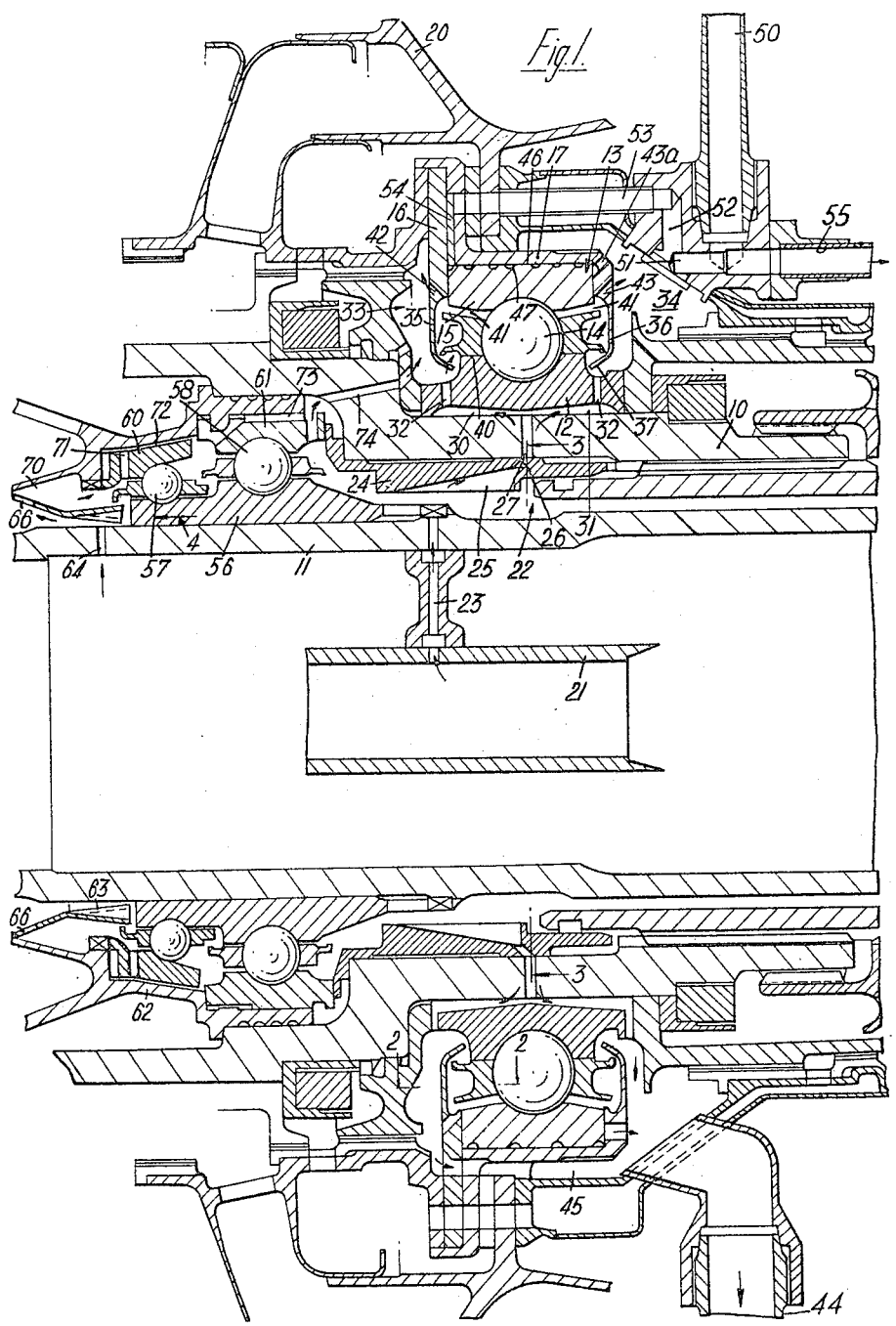

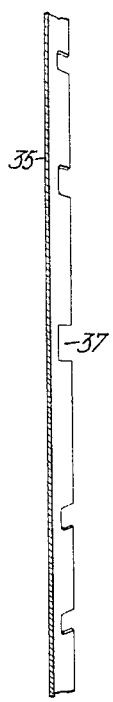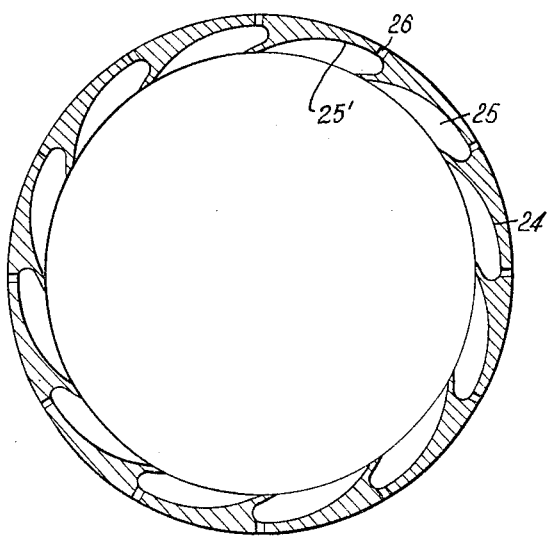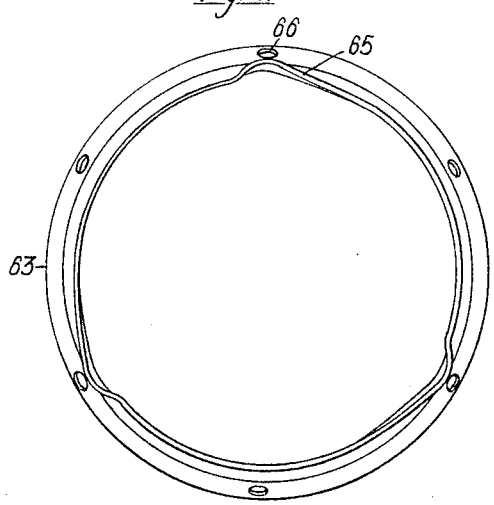

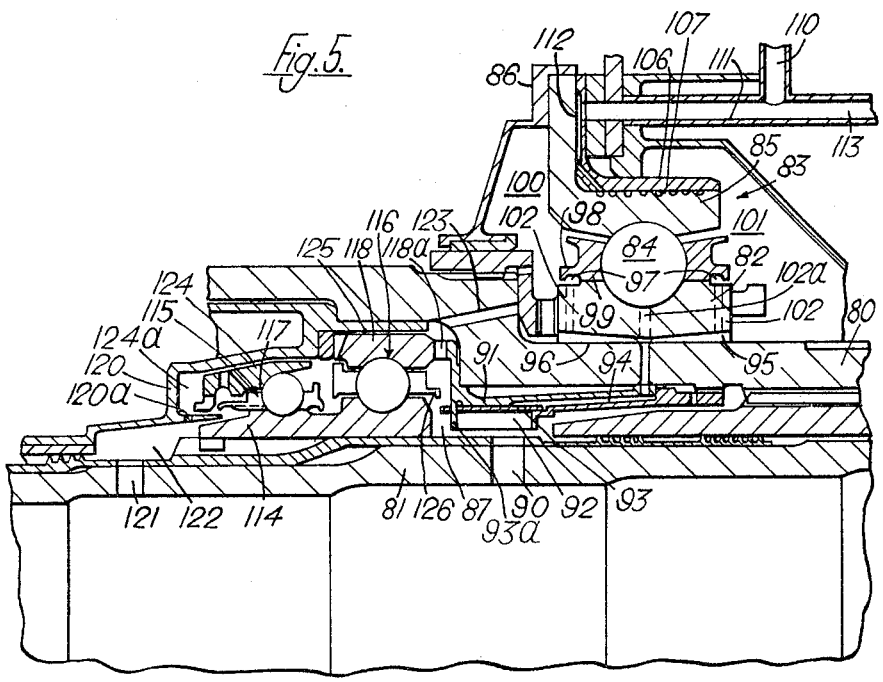

Filed Dec. 27, 1963  4 Sheets-Sheet 4

Inventors
Bernard Diver
Norman Robert Robinson
Wilfred Henry Wilkinson
By Cushman, Darby & Cushman
Attorneys 3,269,786
BEARING ASSEMBLY
Bernard Diver and Norman Robert Robinson, Derby, and Wilfred Henry Wilkinson, Turnditch, Derby, England, assignors to Rolls-Royce Limited, Derby, England, a company of Great Britain
Filed Dec. 27, 1963, Ser. No. 333,892
Claims priority, application Great Britain, Jan. 9, 1963, 1,087/63; Oct. 15, 1963, 40,552/63
10 Claims. (Cl. 308—187)

This invention concerns a bearing assembly.

According to the present invention, there is provided a bearing assembly comprising a fixed annular outer race, a rotatable annular inner race which is mounted concentrically within said outer race and which is spaced therefrom by rolling elements which are in rolling contact with said inner and outer races, rotatable shafting which is mounted in and secured to said inner race, an annular member which is mounted securely within the shafting and which is provided with a plurality of angularly spaced apart pockets each of which communicates with the inner circumferential surface of the annular member, means for supplying the said inner circumferential surface with lubricant, and lubricant passages which are formed in said shafting and inner race, and which lead from at least some of the pockets to the rolling elements, at least the said some pockets being so formed that in operation they both retain a quantity of lubricant therein and also direct a supply of lubricant into the lubricant passages and so to the rolling elements.

The term "rolling elements" as used in this specification is intended to include ball bearings, roller bearings, needle bearings and the like.

Preferably, each pocket is bounded by a wall over which the lubricant passes in flowing into the pocket, the wall preventing reverse flow of lubricant out of the pocket.

Each pocket preferably has a radially outwardly extending surface over which the lubricant is centrifugally forced in passing into the respective lubricant passage.

Each lubricant passage may comprise a radially extending hole through the shafting and an axially extending radially outwardly inclined groove in the inner circumferential surface of the inner race.

The shallowest parts of all the said grooves may be disposed midway between the axially spaced opposite sides of the bearing.

The invention also comprises a gas turbine engine provided with a bearing assembly as set forth above.

Figure 6:
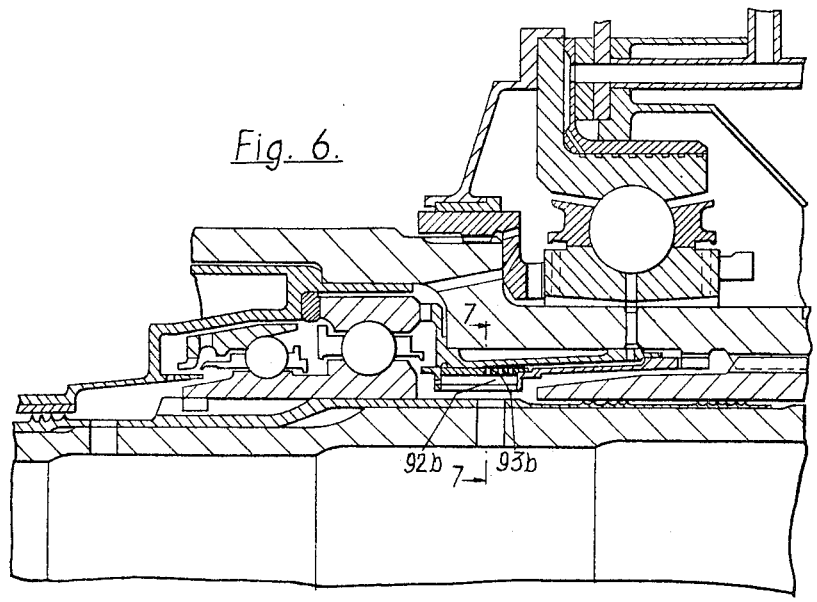
Figure 7:
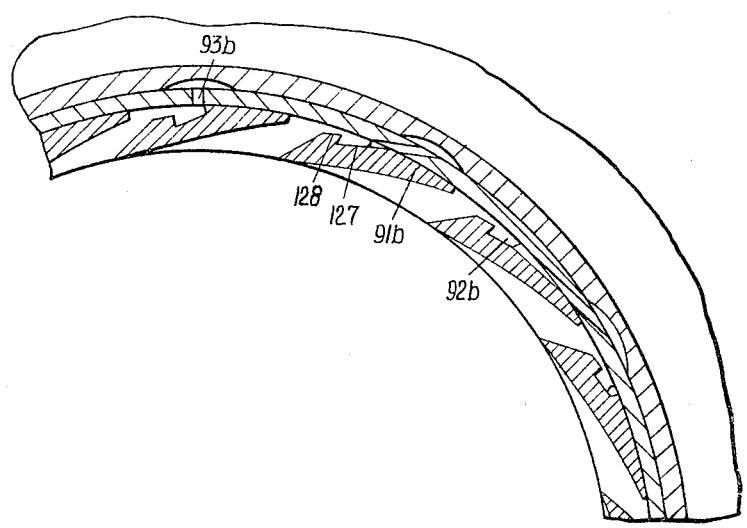

The invention is illustrated, merely by way of example, in the accompanying drawings, in which:

FIGURE 1 is a broken away section of part of a first embodiment of a gas turbine engine provided with a bearing assembly according to the present invention, FIGURE 2 is a broken away section taken on the line 2—2 of FIGURE 1, FIGURE 3 is a section taken on the line 3—3 of FIGURE 1, FIGURE 4 is a view looking in the direction of the arrow 4 of FIGURE 1, FIGURE 5 is a broken away section of part of a second embodiment of a gas turbine engine provided with a bearing assembly according to the present invention, FIGURE 6 is a broken away section of part of a third embodiment of a gas turbine engine provided with a bearing assembly according to the present invention, and FIGURE 7 is a broken away section taken on the line 7—7 of FIGURE 6.

Referring first to FIGURES 1–4 of the drawings, a gas turbine engine is provided with a shaft 10 on which are mounted a high pressure compressor and a high pressure turbine (not shown). Concentrically mounted and nested within the shaft 10 is a shaft 11 on which are mounted a low pressure compressor and a low pressure turbine (not shown).

The shaft 10, adjacent its rear end, is mounted concentrically within a rotatable annular inner race 12 of a thrust bearing 13. The bearing 13, which constitutes the main thrust bearing of the engine, has ball bearings 14 which are in rolling contact with the inner race 12 and with a fixed annular outer race 15 which is mounted concentrically about the inner race 12. The outer race 15 is mounted within two annular members 16, 17 which are secured to each other and to fixed structure 20.

Mounted concentrically within the shaft 11 is a lubricant pipe 21. Between the shafts 10, 11 there is a space 22 which, in operation, is centrifugally supplied with lubricant from the lubricant pipe 21 by way of radially extending lubricant passages 23.

Securely mounted within the shaft 10 is an annular member 24 which bounds the space 22. The internal surface of the annular member 24 is recessed to form a plurality of angularly spaced apart pockets 25, each of which is adapted in operation to retain a quantity of lubricant therein. Moreover, when the engine is not running, some of the pockets 25 will continue to retain some lubricant, so that lubrication of the bearing 13 may commence immediately when the engine has been started. Each of the pockets 25 communicates with a drilling 26 and has a radially outwardly extending surface 25' so as to be shaped to direct lubricant centrifugally into the respective drilling 26. Each drilling 26 communicates with a lubricant passage 27 which leads to radially inner (i.e. the shallowest) parts of a plurality of axially extending radially outwardly inclined, tapered grooves 30 in the inner circumferential surface 31 of the inner race 12. The said shallowest parts of the grooves 30 are disposed midway between the axially spaced opposite sides of the bearing 13.

The radially outermost end of each groove 30 communicates by way of a drilling 32 with annular chambers 33, 34 which are respectively disposed immediately upstream and downstream of the bearing 13.

It will be appreciated that the lubricant flow which will, in operation, be forced centrifugally radially outwardly through the grooves 30 will serve to cool the inner race 12 by taking away heat which has been conducted thereto through the shaft 10 and/or has been generated within the bearing.

The annular members 16, 17 have slotted portions 35, 36 respectively which are respectively arranged to form boundary surfaces of the annular chambers 33, 34. The portions 35, 36 have slots 37 therein which serve to give a very fine metering control of a flow of lubricant therethrough from the drillings 32 to lubricant ducts 40 leading to the ball bearings 14.

Lubricant which has been used in lubricating the ball bearings 14 passes through lubricant ducts 41 and through drillings 42, 43 in the annular members 16, 17 respectively to the annual chambers 33, 34 respectively. Lubricant which has thus been used in cooling and lubricating the bearing 13 passes to a scavenge passage 44. The latter communicates directly with the annular chamber 34 and communicates with the annular chamber 33 by way of a passage 45.

The outer circumferential surface 46 of the outer race 15 has grooves 47 therein which are supplied with lubricant from a lubricant conduit 50 by way of conduits 51, 52, 53, 54. The lubricant which has flowed through the grooves 47 and which has thus cooled the outer race 15 passes through drillings 43a into the annular chamber 34 and thence to the scavenge passage 44.

Some of the lubricant from the lubricant conduit 50 may pass via a conduit 55 to the rear bearing (not shown) of the engine.

The shaft 11 is mounted concentrically within a sleeve 56 which constitutes an inner race of inter-shaft ball bearings 57, 58. The latter have outer races 60, 61 respectively which are mounted within a sleeve member 62 which is itself mounted within the shaft 10.

The sleeve member 62 carries a substantially frusto-conical member 63 (best seen in FIG. 4) which is provided with a series of holes 66. Lubricant from the interior of the shaft 11 may pass centrifugally to the frusto-conical member 63 by way of drillings 64 in the shaft 11, the drillings 64 communicating with the lubricant pipe 21 by means not shown. The frusto-conical member 63 is formed with scoops 65 (FIG. 4) which direct a portion of the lubricant which passes onto the frusto-conical member 63 from the drillings 64 to the ball bearings 57 and thence to the ball bearings 58, after which the lubricant is passed via drillings 74 in the shaft 10 to the annular chamber 33 and finally via the passage 45 to the scavenge passage 44.

Some of the lubricant which has passed through the drillings 64 is centrifuged up the inner surface of the frusto-conical member 63 and flows through the holes 66 to an annular chamber 70 immediately upstream of the ball bearings 57. This flow of lubricant passes from the annular chamber 70 and via drillings 71 to grooves 72 provided in the outer circumferential surface of the outer race 60. Lubricant which has flowed through the grooves 72, and which has thus cooled the outer race 60, passes axially through grooves 73 in the outer circumferential surface of the outer race 61 so as to cool the latter. This lubricant then passes into the annular chamber 33 by way of the drillings 74 in the shaft 10.

It will be seen that, where possible in practice, the lubricating oil supply to each bearing is divided into two flows, one flow serving to lubricate the rolling elements of the bearing and the other flow serving to cool the inner or the outer race. It is preferable that the oil which has served as a cooling medium is not afterwards passed to the rolling elements to serve as a lubricant.

Referring now to FIGURE 5, a gas turbine engine is provided with a shaft 80 on which are mounted a high pressure compressor and a high pressure turbine (not shown). Concentrically mounted within the shaft 80 is a shaft 81 on which are mounted a low pressure compressor and a low pressure turbine (not shown).

The shaft 80, adjacent its rear end, is mounted concentrically within and is secured to a rotatable annular inner race 82 of the main thrust bearing 83 of the engine. The bearing 83 has ball bearings 84 which are in rolling contact with the inner race 82 and with a fixed annular outer race 85 which is mounted concentrically about the inner race 82. The outer race 85 is secured to fixed structure 86.

Between the shafts 80, 81 there is a space 87 which, in operation, is centrifugally supplied with lubricant from the interior of the shaft 81 by way of radially extending lubricant passages 90 in the shaft 81.

Securely mounted within the shaft 80 is an annular member 91 which extends into and receives lubricant from the space 87. The annular member 91 is provided with a plurality of angularly spaced apart pockets 92 each of which extends to the inner circumferential surface of the annular member 91 and each of which, in operation, retains a quantity of lubricant therein. Some of the pockets 92 communicate with drillings 93 into which the lubricant is centrifuged from the pockets 92, the remaining pockets communicating with drillings 93a. Each drilling 93 communicates with a lubricant passage 94. The lubricant passage 94 leads via drillings in the shaft 80 to the radially inner (i.e. the shallowest) parts of a plurality of axially extending radially outwardly inclined, tapered, grooves 95 which are provided in the inner circumferential surface 96 of the inner race 82. The said shallowest parts of the grooves 95 are disposed midway between the axially spaced opposite sides of the bearing 83. The radially outermost ends of the various grooves 95 communicate with annular chambers 100, 101 which are respectively disposed immediately upstream and downstream of the bearing 83.

It will be appreciated that the lubricant flow which will, in operation, be forced centrifugally radially outwardly through the grooves 95 will serve to cool the inner race 82.

Some of the grooves 95 communicate adjacent their radially outermost ends (i.e. adjacent their deepest parts) with holes 102 in the inner race 82 which lead to lubricant traps 97, the latter being formed by flanges 98 on the bearing cage 9. Lubricant supplied to the passages 102 and hence to the traps 97 passes between the cage 99 and the inner race 82 to effect lubrication of the ball bearings 84 and then passes out between the cage 99 and the outer race 85 so as to pass into the annular chambers 100, 101. Lubricant which has thus been used in cooling and lubricating the bearing 83 passes from the annual chambers 100, 101 to a scavenge passage (not shown).

The outer circumferential surface 106 of the outer race 85 has grooves 107 therein which are supplied with lubricant from a lubricant conduit 110 by way of conduits 111, 112. The lubricant which has flowed through the grooves 107 and which has thus cooled the outer race 85 passes into the annular chamber 101, and thence to the said scavenge passage.

Some of the lubricant from the lubricant conduit 110 may pass via a conduit 113 to the rear bearing (not shown) of the engine.

The shaft 81 is mounted concentrically within a sleeve 114 which constitutes an inner race of inter-shaft ball bearings 115, 116. The latter have outer races 117, 118 respectively which are mounted within a sleeve member 120 which is itself mounted within the shaft 80.

Lubricant from the interior of the shaft 81 may pass centrifugally, via radially extending passages 121 in the shaft 81, to an annular chamber 122 within the sleeve member 120.

Some of the lubricant in the chamber 122 flows therefrom along a frusto-conical surface provided on the sleeve member 120 and through the bearing 115, so as to lubricate the latter. A proportion of the lubricant which flows along the said frusto-conical surface passes through drillings 120a, provided in the said frusto-conical surface, to an annular chamber 124a.

The lubricant from the chamber 124a flows successively through grooves 124, 125 provided in the outer circumferential surfaces of the outer races 117, 118 respectively, so as to cool the latter, and then flows via drillings 123 and the chamber 100 to the said scavenge passage.

The bearing 116 is lubricated by lubricant from the pockets 92 which communicate with the drillings 93a, which lubricant is picked-up by an inwardly directed lip 126 provided on the cage member of the bearing 116. After lubricating the bearing 116, the lubricant passes through apertures 118a and then through the drillings 123 and the chamber 100 to the said scavenge passage.

Instead of providing the inner race 82 with the holes 102 for supplying the lubricant to the balls 84 these holes may be dispensed with and replaced by holes 102a which communicate directly with the balls 84. This ensures that the lubricant which passes to the balls 84 through the holes 102a has not received heat by cooling the inner race 82.

In FIGURE 6 there is shown a gas turbine engine which is generally similar to that of FIGURE 5 and which, for that reason, will not be described in detail. Parts shown in FIG. 6 which correspond to parts shown in FIG. 5 are given the same reference numerals with the suffix b.

In the FIG. 6 construction, each of the pockets 92b of the annular member 91b is bounded by a wall 128 (FIGURE 7) over which the lubricant passes in flowing into the pocket 92b the wall 128 preventing reverse flow of lubricant out of the pocket 92b.

Moreover, each pocket 92b has a radially outwardly extending surface 127 over which the lubricant is centrifugally forced in passing into the respective drilling 93b.

We claim:

1. A bearing assembly comprising a fixed annular outer race, a rotatable annular inner race which is mounted concentrically within said outer race and which is spaced therefrom, rolling elements which are in rolling contact with said inner and outer races, rotatable shafting which is mounted in and secured to said inner race, an annular member having an inner circumferential surface, said annular member being mounted securely within the shafting and being provided with a plurality of angularly spaced apart pockets each of which communicates with the inner circumferential surface, means for supplying the said inner circumferential surface with lubricant, and lubricant passages which are formed in said shafting and inner race and which lead from at least some of the pockets to the rolling elements, the said some pockets in operation both retaining a quantity of lubricant therein and also directing a supply of lubricant into the lubricant passages and so to the rolling elements.

2. A bearing assembly comprising a fixed annular outer race, a rotatable annular inner race which is mounted concentrically within said outer race and which is spaced therefrom, rolling elements which are in rolling contact with said inner and outer races, rotatable shafting which is mounted in and secured to said inner race, an annular member having an inner circumferential surface, said member being mounted securely within the shafting and being provided with a plurality of angularly spaced apart pockets each of which communicates with the inner circumferential surface, means for supplying the said inner circumferential surface with lubricant, and lubricant passages which are formed in said shafting and inner race and which lead from at least some of the pockets to the rolling elements, and a wall which bounds each pocket and over which the lubricant passes in flowing into the pocket, the wall preventing reverse flow of lubricant out of the pocket.

3. A bearing assembly as claimed in claim 2 in which each pocket has a radially outwardly extending surface over which the lubricant is centrifugally forced in passing into the respective lubricant passages.

4. A bearing assembly as claimed in claim 3 in which each lubricant passage comprises a radially extending hole through the shafting and an axially extending radially outwardly inclined groove in the inner circumferential surface of the inner race.

5. A bearing assembly as claimed in claim 4 in which the shallowest part of each groove is disposed midway between the axially spaced opposite sides of the inner race.

6. A bearing assembly as claimed in claim 1 including at least one additional bearing, and means for supplying lubricant from at least some of said pockets to said additional bearing.

7. A bearing assembly comprising a fixed annular outer race, a rotatable annular inner race which is mounted concentrically within said outer race and which is spaced therefrom, rolling elements which are in rolling contact with said inner and outer races, rotatable shafting which is mounted in and secured to said inner race, an annular member having an inner circumferential surface, said annular member being mounted securely within the shafting and being provided with a plurality of angularly spaced apart pockets each of which communicates with the inner circumferential surface, means for supplying said inner circumferential surface with lubricant, and lubricant passages which are formed in said shafting and inner race and which lead from at least some of the pockets to the rolling elements, the lubricant passages centrifugally receiving a supply of lubricant from said pockets, and said pockets being arranged and constructed in said annular member so that at least some of said pockets retain a quantity of lubricant therein when the bearing assembly is stationary.

8. A bearing assembly as claimed in claim 7 in which each pocket has a radially outwardly extending surface over which lubricant is centrifugally forced in passing into the respective lubricant passages.

9. A bearing assembly as claimed in claim 8 in which each lubricant passage comprises a radially extending hole through the shafting and an axially extending radially outwardly inclined groove in the inner circumferential surface of said inner race.

10. A bearing assembly as claimed in claim 9 in which the shallowest part of each said groove is disposed midway between the axially spaced opposite sides of said inner race.

References Cited by the Examiner

UNITED STATES PATENTS 2,911,267  11/1959  Small _____ 308—187

FOREIGN PATENTS 564,792  10/1923  France.
624,557  5/1933  Germany.

DAVID J. WILLIAMOWSKY, *Primary Examiner.*

FRANK SUSKO, *Examiner.*